(12) United States Patent
Yang et al.

(10) Patent No.: US 9,596,700 B2
(45) Date of Patent: Mar. 14, 2017

(54) ENCODING METHOD FOR TRAFFIC INDICATION MAP AND BEACON FRAME

(71) Applicant: Huawei Technologies Co., Ltd., Shenzhen, Guangdong (CN)

(72) Inventors: Xun Yang, Shenzhen (CN); Lvxi Yang, Nanjing (CN); Kang Song, Nanjing (CN); Yongming Huang, Nanjing (CN); Chunguo Li, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 240 days.

(21) Appl. No.: 14/309,428

(22) Filed: Jun. 19, 2014

(65) Prior Publication Data

US 2014/0301322 A1    Oct. 9, 2014

Related U.S. Application Data

(63) Continuation of application No. PCT/CN2012/086637, filed on Dec. 14, 2012.

(30) Foreign Application Priority Data

Dec. 19, 2011  (CN) .......................... 2011 1 0427070
Apr. 6, 2012   (CN) .......................... 2012 1 0099618

(51) Int. Cl.
    *H04W 4/00*     (2009.01)
    *H04W 74/00*    (2009.01)
    (Continued)

(52) U.S. Cl.
    CPC ....... *H04W 74/004* (2013.01); *H04L 29/0604* (2013.01); *H04L 69/04* (2013.01);
    (Continued)

(58) Field of Classification Search
    CPC .. H04W 74/004; H04W 74/006; H04L 69/04; H04L 29/0604
    See application file for complete search history.

(56) References Cited

U.S. PATENT DOCUMENTS

2005/0254444 A1   11/2005   Meier et al.
2009/0010191 A1    1/2009   Wentink
(Continued)

FOREIGN PATENT DOCUMENTS

CN    1947357 A    4/2007

OTHER PUBLICATIONS

Zweig, "Suggested Encoding for the TIM Element," IEEE 802.11: Wireless Access Method and Physical Layer Specifications, pp. 1-2, Institute of Electrical and Electronics Engineers, New York, New York (Sep. 1995).
(Continued)

*Primary Examiner* — Derrick Ferris
*Assistant Examiner* — Farhad Ali
(74) *Attorney, Agent, or Firm* — Leydig, Voit & Mayer, Ltd.

(57) ABSTRACT

Embodiments of the present disclosure provide an encoding method for a traffic indication map and a beacon frame, which relate to a communication field, enable a user to know whether there are data cached in an access point or enable a user terminal to know whether to access to a channel, and reduce the quantity of bytes occupied by the traffic indication map in the beacon frame. The encoding method for a traffic indication map provided by the embodiments comprises: controlling whether to display a sub-block bitmap display field in a sub-bitmap by marking at least one bit in a bitmap control field, a sub-block sub-bitmap in the sub-bitmap being used for enabling a user terminal to know (Continued)

whether there are data cached in an access point, or enabling the user terminal to know whether to access to a channel.

13 Claims, 6 Drawing Sheets

(51) Int. Cl.
　　 *H04L 29/06* (2006.01)
　　 *H04W 28/06* (2009.01)
　　 *H04W 48/12* (2009.01)
(52) U.S. Cl.
　　 CPC .......... *H04W 74/006* (2013.01); *H04W 28/06* (2013.01); *H04W 48/12* (2013.01)

(56) References Cited

U.S. PATENT DOCUMENTS

| | | |
|---|---|---|
| 2009/0016306 A1 | 1/2009 | Wang et al. |
| 2014/0204960 A1* | 7/2014 | Park .................... H04L 12/4633 370/474 |

OTHER PUBLICATIONS

"IEEE Standard for Information Technology-Telecommunications and information exchange between systems-Local and metropolitan area networks-Specific requirements, Part 11: Wireless LAN Medium Access Control (MAC) and Physical Layer (PHY) Specifications," IEEE Std. 802.11-2007, pp. i-1184, Institute of Electrical and Electronics Engineers, New York, New York (Jun. 12, 2007).

Zhou et al., "Extension of AID and TIM to Support 6000 STAs in 802.11ah," IEEE 802.11-11/1550r1, Slides 1-9, Institute of Electrical and Electronics Engineers, New York, New York (Nov. 8, 2011).

Park et al., "TGah Efficient TIM Encoding," IEEE 802.11-12/388r1, Slides 1-26, Institute of Electrical and Electronics Engineers, New York, New York (Mar. 14, 2012).

Merlin et al., "Efficient TIM signaling," Extend Submission, 20111031r0 Qualcomm Efficient TIM signaling, Slides 1-12 (Oct. 31, 2011).

Park et al., "TGah TIM Element Improvements," Extend Submission, 20111114r1-Intel-TIM-Improvement-block-level, Slides 1-23 (Nov. 14, 2011).

* cited by examiner

ENCODING METHOD FOR TRAFFIC INDICATION MAP AND BEACON FRAME

CROSS-REFERENCE TO RELATED APPLICATIONS

This application is a continuation of International Patent Application No. PCT/CN2012/086637, filed on Dec. 14, 2012, which claims priority to Chinese Patent Application No. 201110427070.1, filed on Dec. 19, 2011 and Chinese Patent Application No. 201210099618.9, filed on Apr. 6, 2012, all of which are hereby incorporated by reference in their entireties.

TECHNICAL FIELD

The present disclosure relates to a field of communication, and particularly, relates to an encoding method for a traffic indication map and a beacon frame.

BACKGROUND

In WLAN (Wireless Local Area Networks), after a user terminal enters a coverage scope of an AP (Access Point), the access point sends a specific association identifier to the user terminal and may broadcast a beacon frame periodically. Each beacon frame contains a TIM (Traffic Indication Map), and a bitmap in the TIM may indicate whether data needing to be transmitted to the user terminal are cached in the access point. After receiving the beacon frame, the user terminal may read the TIM in the beacon frame by the specific association identifier so as to know whether there are data cached in the access point. If the user terminal knows there are data cached in the access point, the user terminal may wait for receiving the data transmitted by the access point, and if the user terminal reads there is no data cached in the access point, the user terminal may enter a dormant state to save power.

However, with regard to the prior art, the inventor has found that if the quantity of the user terminals with cached data in the access point is close to the quantity of user terminals without cached data, time for generating the TIM in the beacon frame by the access point is still very long, that is, the quantity of bytes occupied by the TIM is still large, and lots of time is needed for transmitting the beacon frame. Moreover, association identifiers of user terminals are arrayed according to a certain sequence, if the distances among the association identifiers of a plurality of user terminals are far, the time for generating the TIM in the beacon frame by the access point is also very long, that is, the quantity of bytes occupied by the TIM is large, and then lots of time is also needed for transmitting the beacon frame.

SUMMARY

Embodiments of the present disclosure provide an encoding method for a traffic indication map and a beacon frame, which may enable a user to know whether there are data cached in an access point, or enable a user terminal to know whether to access to a channel, and reduce the quantity of bytes occupied by a traffic indication map in a beacon frame.

The embodiments of the present disclosure adopt the following technical solutions.

On one aspect, an embodiment of the present disclosure provides an encoding method for a traffic indication map, including:

controlling whether to display a sub-block bitmap display field in a sub-bitmap by marking at least one bit in a bitmap control field, a sub-block sub-bitmap in the sub-bitmap being used for enabling a user terminal to know whether there are data cached in an access point, or enabling the user terminal to know whether to access to a channel.

On another aspect, an embodiment of the present disclosure provides an encoding method for a traffic indication map, including:

controlling whether to display a sub-block bitmap display field in a sub-bitmap by setting a first identity in a sub-block bitmap control field in the sub-bitmap, a sub-block sub-bitmap in the sub-bitmap being used for enabling a user terminal to know whether there are data cached in an access point, or enabling the user terminal to know whether to access to a channel.

On another aspect, an embodiment of the present disclosure provides an encoding method for a traffic indication map, including:

controlling whether to display a sub-block bitmap display field in a sub-bitmap by setting a second identity in a sub-block bitmap control field in the sub-bitmap, a sub-block sub-bitmap in the sub-bitmap being used for enabling a user terminal to know whether there are data cached in an access point, or enabling the user terminal to know whether to access to a channel.

On one aspect, an embodiment of the present disclosure provides a beacon frame (Beacon), and the beacon frame includes a traffic indication map, wherein the traffic indication map includes an element identity and a length identity, the element identity being used for indicating that a code is the traffic indication map, the length identity being used for indicating a length of the traffic indication map; and further includes:

a bitmap control field and a sub-bitmap, used for controlling whether to display a sub-block bitmap display field in the sub-bitmap by marking at least one bit in the bitmap control field, a sub-block sub-bitmap in the sub-bitmap being used for enabling a user terminal to know whether there are data cached in an access point, or enabling the user terminal to know whether to access to a channel.

On another aspect, an embodiment of the present disclosure provides a beacon frame (Beacon), and the beacon frame includes a traffic indication map, wherein the traffic indication map includes an element identity and a length identity, the element identity being used for indicating that a code is the traffic indication map, the length identity being used for indicating a length of the traffic indication map; and further includes:

a sub-bitmaps, used for controlling whether to display a sub-block bitmap display field in the sub-bitmap by setting a first identity in a sub-block bitmap control field in the sub-bitmap, a sub-block sub-bitmap in the sub-bitmap being used for enabling a user terminal to know whether there are data cached in an access point, or enabling the user terminal to know whether to access to a channel.

On another aspect, an embodiment of the present disclosure provides a beacon frame (Beacon), and the beacon frame includes a traffic indication map, wherein the traffic indication map includes an element identity and a length identity, the element identity being used for indicating that a code is the traffic indication map, the length identity being used for indicating a length of the traffic indication map; and further includes:

a sub-bitmap, used for controlling whether to display a sub-block bitmap display field in a sub-bitmap by setting a second identity in a sub-block bitmap control field in the sub-bitmap, a sub-block sub-bitmap in the sub-bitmap being used for enabling a user terminal to know whether there are data cached in an access point, or enabling the user terminal to know whether to access to a channel.

According to the traffic indication map and the encoding method provided by the embodiments of the present disclosure, whether to display the sub-block bitmap display field in the sub-bitmap is controlled by marking at least one bit in the bitmap control field, or setting the first identity in the sub-block bitmap control field in the sub-bitmap, or setting the second identity in the sub-block bitmap control field in the sub-bitmap, finally, the user terminal knows whether there are data cached in the access point by the sub-block sub-bitmap in the sub-bitmap. By the solution, the user terminal is enabled to know whether there are data cached in the access point, or the user terminal is enabled to know whether to access to a channel, and the quantity of bytes occupied by the traffic indication map in the beacon frame may be reduced by controlling whether to display the sub-block bitmap display field in the sub-bitmap.

DESCRIPTION OF THE EMBODIMENTS

Figure 1:
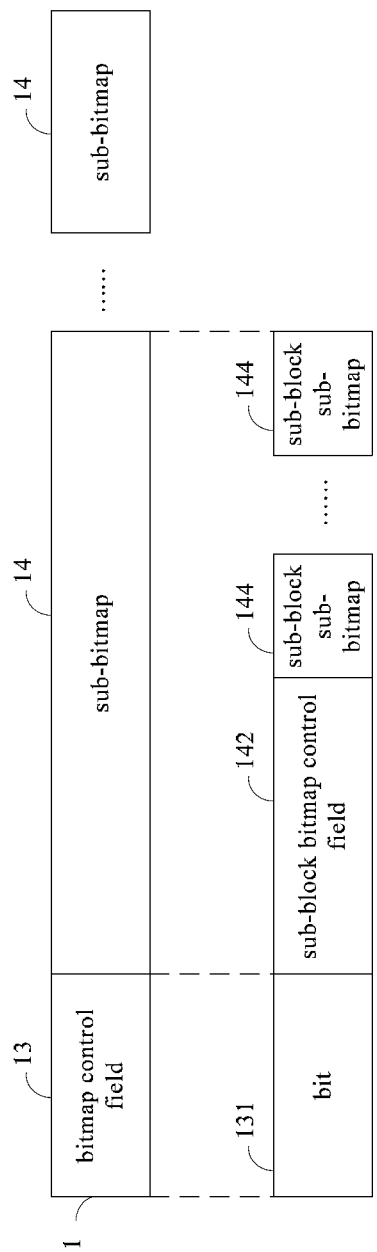
FIG. 1 is a first one of a structure schematic diagram of a traffic indication map provided by an embodiment of the present disclosure.

A clear and complete description of technical solutions of the embodiments of the present disclosure will be given below, in combination with the accompanying drawings in the embodiments of the present disclosure. Apparently, the embodiments described below are merely a part, but not all, of the embodiments of the present disclosure. All of other embodiments, obtained by those skilled in the art based on the embodiments of the present disclosure without any inventive efforts, fall into the protection scope of the present disclosure.

An embodiment of the present disclosure provides an encoding method for a traffic indication map, including:

an access point controls whether to display or hide a sub-block bitmap display field in a sub-bitmap by marking at least one bit in a bitmap control field, a sub-block sub-bitmap in the sub-bitmap being used for enabling a user terminal to know whether there are data cached in the access point, or enabling the user terminal to know whether to access to a channel.

After each user terminal enters the coverage scope of the access point, the access point may send a specific association identifier to the user terminal. The association identifier may be twelve bits, and every association identifier is arrayed according to a certain sequence. An overall bitmap is stored in the access point, and the overall bitmap may record whether all the user terminals in the coverage scope of the access point have caches in the access point. The access point may generate and broadcast a beacon frame periodically. Each beacon frame may include a traffic indication map, the traffic indication map may carry a partial bitmap, and all the partial bitmaps compose the overall bitmap. The user terminal reads the traffic indication map according to the association identifier, so as to know whether there are caches in the access point, or enable the user terminal to know whether to access to a channel.

A traffic indication map includes an element identity, a length identity, a bitmap control field and a sub-bitmap. The element identity is used for indicating that it is the traffic indication map, because the beacon frame may also include other codes, the element identity is used for indicating that this code is the traffic indication map; the length identity is used for indicating the quantity of bytes occupied by the traffic indication map; the bitmap control field includes at least one bit and a bitmap index, wherein the bitmap index is used for indicating which part of the overall bitmap the partial bitmap composed by every sub-bitmap is; the sub-bitmap includes a sub-block bitmap index, a sub-block bitmap control field, a sub-block bitmap display field and a sub-block sub-bitmap, wherein the sub-block bitmap index is used for indicating which part of the partial bitmap the sub-bitmap is, the sub-block bitmap control field is used for indicating an encoding mode for the sub-block sub-bitmap, the sub-block bitmap display field is used for controlling the sub-block sub-bitmap, for example, hiding the bytes which are all zero in the sub-block sub-bitmap, and the sub-block sub-bitmap is used for enabling the user terminal to know whether there are data cached in the access point, or enabling the user terminal to know whether to access to a channel.

As an embodiment of the present disclosure, when the access point determines that the difference between the quantity of user terminals with cached data and the quantity of user terminals without cached data is not larger than a preset first threshold, the access point marks at least one bit in a bitmap control field with a first symbol, and hides a sub-block bitmap display field in each sub-bitmap, so that each sub-bitmap saves the expense of one byte. If at least one bit in the bitmap control field is marked with the first symbol, it is indicated that each sub-bitmap includes at least one sub-block sub-bitmap, a specific quantity may be eight, and the length of each sub-block sub-bitmap is at least one byte. When the access point determines that the absolute value of the difference between the quantity of user terminals with cached data and the quantity of user terminals without cached data is larger than the preset first threshold, the access point marks at least one bit in the bitmap control field with a second symbol, and displays the sub-block bitmap display field in each sub-bitmap.

Because the access point may inform the user terminal of whether there are cached data by setting 0 or 1 in a bit corresponding to the user terminal in the sub-block sub-bitmap, that the difference between the quantity of the user terminals with the cached data and the quantity of the user terminals without the cached data is not larger than the preset first threshold may be simply understood as that, if the quantity of 0 is close to the quantity of 1, at least one bit in the bitmap control field is marked with the first symbol, and the sub-block bitmap display field in each sub-bitmap is hidden, if the quantity of 0 is not close to the quantity of 1, at least one bit in the bitmap control field is marked with the second symbol, and the sub-block bitmap display field in each sub-bitmap is displayed.

Herein, the access point may mark one or more bits of at least one bit in the bitmap control field. For example, by marking 1, may use one bit to indicate hiding of the sub-block bitmap display field in each sub-bitmap, or, by marking 101, may use three bits to indicate hiding of the sub-block bitmap display field in each sub-bitmap. Because they are all used for controlling display or hiding of the sub-block bitmap display field in each sub-bitmap, they should all fall within the protection scope of the embodiment.

The access point enables the user terminal to know whether there are data cached in the access point by the sub-block sub-bitmap in the sub-bitmap. As an example, if the access point sets one bit corresponding to a certain user terminal of the sub-block sub-bitmap in the sub-bitmap to be 1, while reading the sub-block sub-bitmap according to the association identifier, the user terminal may know there are data cached in the access point and the user terminal may wait for receiving the data transmitted by the access point; or the user terminal may know that it may access to the channel. If the access point sets one bit corresponding to a certain user terminal of the sub-block sub-bitmap in the sub-bitmap to be 0, while reading the sub-block sub-bitmap according to the association identifier, the user terminal may know there is no data cached in the access point and the user terminal may enter a dormant state to save power; or the user terminal may know that it may not access to the channel.

In addition, at least one bit in the bitmap control field is marked in this encoding mode, similarly, other encoding modes may also be adopted for marking at least one bit. For example, a negation indication is represented by one bit, that is, when the bit is 1, the following bit mapping is negating the original bit mapping at first and then representing according to a part or all of the remaining bit indications. Because they are all adopting a certain encoding mode for marking at least one bit, they are not described redundantly herein.

An access point controls whether to display a sub-block bitmap display field in a sub-bitmap by setting a first identity in a sub-block bitmap control field in the sub-bitmap, a sub-block sub-bitmap in the sub-bitmap being used for enabling a user terminal to know whether there are data cached in the access point, or enabling the user terminal to know whether to access to a channel.

As another embodiment of the present disclosure, when the access point determines that the differences among association identifiers of user terminals with cached data are all not smaller than a preset second threshold, the access point sets the first identity in the sub-block bitmap control field in the sub-bitmap, and hides the sub-block bitmap display field in the sub-bitmap. If the first identity is set in the sub-block bitmap control field in the sub-bitmap, it is indicated that the sub-bitmap includes at least one sub-block sub-bitmap, wherein the sub-block sub-bitmap in the sub-bitmap may specifically be a partial bitmap. When the access point determines that the absolute value of the difference between the quantity of user terminals with cached data and the quantity of user terminals without cached data is larger than a preset first threshold, the access point displays the sub-block bitmap display field in each sub-bitmap.

It needs to be noted that, this encoding mode for a traffic indication map is still executed when the access point determines that the difference between the quantity of the user terminals with the cached data and the quantity of the user terminals without the cached data is not larger than the preset first threshold. The difference between this encoding mode and the aforementioned encoding mode for a traffic indication map lies in that, this encoding mode is that if the access point sets the first identity in the sub-block bitmap control field in a certain sub-bitmap, only the sub-block bitmap display field in the sub-bitmap is hidden, if the access point does not set the first identity in the bitmap control field, only the sub-block bitmap display field in the sub-bitmap is displayed, and sub-block bitmap display fields in other sub-bitmaps may be hidden or displayed. The aforementioned encoding mode is marking at least one bit in the bitmap control field, if the first symbol is used for marking, sub-block bitmap display fields in all sub-bitmaps in the traffic indication map are hidden, and if the second symbol is used for marking, sub-block bitmap display fields in all sub-bitmaps in the traffic indication map are displayed.

The access point enables the user terminal to know whether there are data cached in the access point, or enables the user terminal to know whether to access to a channel by storing data in the sub-block sub-bitmap in the sub-bitmap.

An access point controls whether to display a sub-block bitmap display field in a sub-bitmap by setting a second identity in a sub-block bitmap control field in the sub-bitmap, a sub-block sub-bitmap in the sub-bitmap being used for enabling a user terminal to know whether there are data cached in the access point, or enabling the user terminal to know whether to access to a channel.

As another embodiment of the present disclosure, when the access point determines that the differences among association identifiers of user terminals with cached data are all not smaller than a preset second threshold, the access point sets the second identity in the sub-block bitmap control field in the sub-bitmap, and hides the sub-block bitmap display field in the sub-bitmap, so that the sub-bitmap saves the expense of one byte. When the differences among the association identifiers of the user terminals with the cached data are all smaller than the second threshold, the sub-block bitmap display field in the sub-bitmap is displayed.

Because the association identifier of every user is arrayed according to a certain sequence, that the differences among the association identifiers of the user terminals with the cached data are all not smaller than the preset second threshold may be simply understood as that, if the distance between the association identifiers of every two user terminals is far, that is, there are only caches of several sparse user terminals, the second identity is set in the sub-block bitmap control field in the sub-bitmap, and the sub-block bitmap display field in the sub-bitmap is hidden, and if the differences among the association identifiers of the user terminals with the cached data are all smaller than the second threshold, the sub-block bitmap display field in the sub-bitmap is displayed.

If the second identity is set in the sub-block bitmap control field in a sub-bitmap, it is indicated that the sub-bitmap includes zero to eight sub-block sub-bitmaps, and the length of each sub-block sub-bitmap is one byte.

The low-order six bits of the sub-block sub-bitmap in the sub-bitmap are the low-order six bits of the association identifier of the user terminal, one of the high-order two bits may be selected to represent whether the sub-block sub-bitmap is the last sub-block sub-bitmap in the sub-bitmap, then, in consideration of all cases, the quantity of the sub-block sub-bitmaps in the sub-bitmap may be zero to eight.

It needs to be noted that, the maximum quantity of the sub-block sub-bitmaps is set to be eight as an example herein, the maximum quantity may also be set to be a larger or smaller value. The objective of the present disclosure is to reduce the quantity of bytes of a traffic indication map by adopting various encoding modes, therefore, the setting for the maximum quantity to be eight is a preferred solution, and if the quantity of the users needing to be represented is much larger, bytes may be saved better by adopting other encoding modes relative to this encoding mode.

As another embodiment of the present disclosure, when an access point determines that the differences among all or most of association identifiers of user terminals with cached data are all smaller than a preset third threshold, the access point sets a third identity in a sub-block bitmap control field in a sub-bitmap, and hides a sub-block bitmap display field in the sub-bitmap, so that the sub-bitmap saves the expense of one byte. When the differences among a part of the association identifiers of the user terminals with the cached data are larger than the third threshold, the third identity is not set in the sub-block bitmap control field in the sub-bitmap.

Because the association identifier of every user is arrayed according to a certain sequence, that the differences among all or most of the association identifiers of the user terminals with the cached data are all smaller than the preset third threshold may be simply understood as that, if the distance between the association identifiers of every two user terminals is much close, that is, adjacent users in a certain section all have cached data, the third identity is set in the sub-block bitmap control field in the sub-bitmap, and the sub-block bitmap display field in the sub-bitmap is hidden, and when the differences among a part of the association identifiers of the user terminals with the cached data are larger than the third threshold, the third identity is not set in the sub-block bitmap control field in the sub-bitmap.

If the third identity is set in the sub-block bitmap control field in the sub-bitmap, it is indicated that the representation form of the sub-bitmap is a user association identifier (AID), and the previous user association identifier (AID) is used as an initial user identity, and the last user association identifier (AID) is used as an ending user identity. Users between the users represented by the two AIDs are all indicated in the sub-bitmap.

Two bytes may be allocated to a sub-block sub-bitmap in a sub-bitmap, so that a sub-block sub-bitmap represents a user association identifier; one byte may also be allocated to a sub-block sub-bitmap, so that a sub-block sub-bitmap represents partial information (such as low-order eight bits) of a user association identifier. Or the previous embodiment may be followed, and only low-order six bits are used as the low-order six bits of the association identifier of the user terminal. In consideration of all cases, the quantity of the sub-block sub-bitmaps in the sub-bitmap may be two or four.

As another embodiment of the present disclosure, the indication method may be further optimized using the correlation of traffic indication maps sent continuously. When an access point determines that the difference between user terminals with cached data in this beacon (Beacon) cycle and user terminals with cached data in a certain previous beacon cycle is smaller than a preset fourth threshold, the access point adds two indication domains, namely traffic indication map control and traffic indication map number, in a traffic indication map, wherein the using of the traffic indication map control is indicating whether the content indicated by the current traffic indication map is a difference from the traffic indication map in a certain previous beacon frame or is independent of the traffic indication map in the certain previous beacon frame. If it is the difference, the traffic indication map number compared by the current traffic indication map is added in the traffic indication map number domain; and if it is independent, a new traffic indication map number needs to be allocated for the current traffic indication map in the traffic indication map number domain.

The difference herein is the quantity of different user terminals in user terminals involved in the two beacon frames.

During a specific implementation, two sub-domains of traffic indication map control and traffic indication map number may be placed in the bitmap control field, or new fields may be added in the traffic indication map used for representing the two domains.

As an example, settings for the traffic indication map control domain may have the functions below:

TABLE 1 definition of traffic indication map control domain (example)

| Grouping control information (3 bits) | Meaning |
| --- | --- |
| 000 | defining a new traffic indication map/redefining a certain previous traffic indication map |
| 001 | using a certain previous traffic indication map |
| 010 | temporarily increasing a user terminal (STA) based on a certain previous traffic indication map, and indicating in a sub-bitmap, valid only for this time |
| 011 | temporarily reducing a user terminal based on a certain previous traffic indication map, and indicating in a sub-bitmap, valid only for this time |
| 100 | permanently increasing a user terminal based on a certain previous traffic indication map, and indicating in a sub-bitmap |
| 101 | permanently reducing a user terminal based on a certain previous traffic indication map, and indicating in a sub-bitmap |
| others | reserve |

As another embodiment of the present disclosure, further optimization may be performed aiming at the case that many continuous blocks have indications. According to this embodiment, a length field (for example, the length field may be one byte) is added behind a sub-block bitmap control, and used for indicating the length of the subsequent blocks or sub-blocks adopting the same compression method. When an access point divides an STA bitmap involved in this beacon (Beacon) cycle into many sub-bitmaps, if two or more adjacent blocks adopt the same coding, it is indicated in a sub-block bitmap control field of a sub-block that the present block has a length field, and the quantity of sub-blocks or blocks adopting the coding is indicated by the length field. The same encoding mode may adopt the sub-block bitmap display field. In a scope indicated by the length field, sub-block bitmap index fields and sub-block bitmap control fields in other blocks may be effectively saved. A scenario involved in the embodiment is that two or more continuous blocks adopt the same encoding mode.

As another embodiment of the present disclosure, further optimization may be performed aiming at the case that many continuous blocks have indications. In this embodiment, when an access point divides an STA bitmap involved in this beacon (Beacon) cycle into many sub-bitmaps, if two or more adjacent blocks adopt the same coding, it is indicated in a bitmap control field of a sub-block that the unit indicated by a sub-block bitmap display field in the present block changes from a sub-block to a block, namely, it is set that the scope indicated by the sub-block bitmap display field in the bitmap control field of a sub-bitmap includes a plurality of subsequent sub-bitmaps, wherein the first bit in the sub-block bitmap display field indicates whether the present block or the next block adjacent to the present block is uncoded bitmap indication information.

If the bit is 0, the corresponding block does not adopt an uncoded bitmap indication method; if the bit is 1, the corresponding block adopts an uncoded bitmap indication method. By that analogy, if the length of a sub-block bitmap control field is eight bits, the bitmap control field may indicate whether nine blocks (including the present block) adopt the uncoded bitmap indication method at most. The eight bits of the field length correspond to eight subsequent blocks respectively, and bitmap indication information of the corresponding block is indicated according to the value of a sub-block display field. For example, the first bit corresponds to the first subsequent block, that is, the $n^{th}$ bit corresponds to the $n^{th}$ subsequent block. In the effectively indicated scope, sub-block bitmap index fields, sub-block bitmap control fields and sub-block bitmap display fields in other blocks may be effectively saved by this method.

As above-mentioned, a traffic indication map includes an element identity, a length identity, a bitmap control field and a sub-bitmap. In the above-mentioned embodiment, whether to display a sub-block bitmap display field in a sub-bitmap is controlled by taking marking at least one bit of a bitmap control field in a traffic indication map (TIM) as an example. Further, during a specific implementation, other fields in the TIM may be marked to achieve the above-mentioned same effect. In other implementation methods, such as using other reserved bits or idle bits in the TIM, other bits are selected to mark fields so as to control whether to display the sub-block bitmap display field in the sub-bitmap on the basis of not influencing the necessary functions of the TIM.

A determining basis of an access point may also be condition of a user expected to access to a channel by the access point, besides the quantity of user terminals with cached data. For example, with regard to the first embodiment, the determining criteria may be: a difference between the quantity of user terminals expected to access to a channel by the access point and the quantity of user terminals unexpected to access to a channel by the access point is not larger than a preset first threshold. With regard to the second and the third embodiments, the determining criteria may be: differences among association identifiers of user terminals expected to access to a channel by the access point are all not smaller than a preset second threshold. With regard to the fourth embodiment, the determining criteria may be: differences among all or most of association identifiers of user terminals expected to access to a channel by the access point are all smaller than a preset third threshold. With regard to the fifth embodiment, the determining criteria may be: a difference between user terminals expected to access to a channel by the access point in a current beacon frame and user terminals expected to access to a channel by the access point in a certain previous beacon frame is smaller than a preset fourth threshold.

An access point enables a user terminal to know whether there are data cached in the access point by storing data or a user identity in a sub-block sub-bitmap in a sub-bitmap.

Similarly, an access point may control whether to display or hide a sub-block bitmap display field in a sub-bitmap by marking at least one bit in a bitmap control field, or setting a first identity in a sub-block bitmap control field in the sub-bitmap or setting a second identity in a sub-block bitmap control field in the sub-bitmap, wherein a sub-block sub-bitmap in the sub-bitmap is used for enabling a user terminal to know whether to access to a channel.

When a user terminal is in a dormant state, the user terminal only receives a beacon frame. Therefore, if an access point wants the user terminal to access to a channel, the access point may generate a traffic indication map by an encoding mode provided by the present embodiment, and then enables the user terminal to know whether to access to a channel by sending a beacon frame. Because the encoding mode is the same as the above-mentioned embodiment, it is not described redundantly herein, but it should also fall within the protection scope of the present disclosure.

According to the encoding method for the traffic indication map provided by the embodiments of the present disclosure, whether to display the sub-block bitmap display field in the sub-bitmap is controlled by marking at least one bit in the bitmap control field, or setting the first identity in the sub-block bitmap control field in the sub-bitmap, or setting the second identity in the sub-block bitmap control field in the sub-bitmap, finally, the user terminal knows whether there are data cached in the access point by the sub-block sub-bitmap in the sub-bitmap. By the solution, the user terminal is enabled to know whether there are data cached in the access point, or the user terminal is enabled to know whether to access to a channel, and the quantity of bytes occupied by the traffic indication map in the beacon frame may be reduced by controlling whether to display the sub-block bitmap display field in the sub-bitmap.

Corresponding to the above-mentioned encoding mode for a traffic indication map, the present disclosure further provides a beacon frame (Beacon). The beacon frame includes a traffic indication map 1, as shown in FIG. 1, including a bitmap control field 13 and one or more sub-bitmaps 14, wherein the bitmap control field 13 includes at least one bit 131, and the sub-bitmap 14 includes a sub-block bitmap control field 142 and one or more sub-block sub-bitmaps 144.

Figure 2:
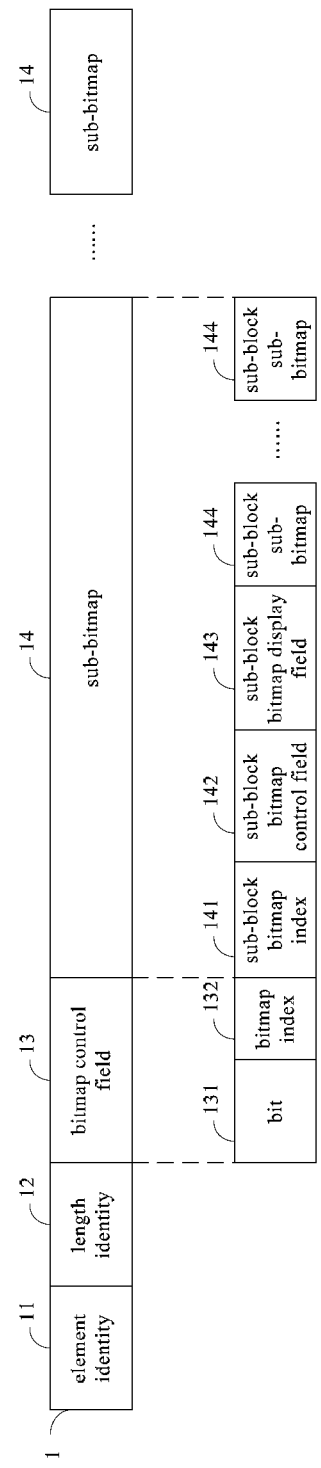
FIG. 2 is a second one of a structure schematic diagram of a traffic indication map provided by an embodiment of the present disclosure.

Further, as shown in FIG. 2, the traffic indication map 1 further includes an element identity 11 and a length identity 12; the bitmap control field 13 further includes a bitmap index 132; and the sub-bitmap 14 further includes a sub-block bitmap index 141 and a sub-block bitmap display field 143.

The element identity 11 with one byte is used for representing that it is the traffic indication map, and because the beacon frame may also include other codes, the element identity 11 is used for indicating that this code is the traffic indication map; the length identity 12 with one byte is used for representing the quantity of bytes occupied by the traffic indication map; the bitmap control field 13 with one byte may include a bit 131 and a bitmap index 132, wherein the bitmap index 132 is used for indicating which part of the overall bitmap the partial bitmap composed by every sub-bitmap is; the sub-bitmap 14 includes a sub-block bitmap index 141, a sub-block bitmap control field 142, a sub-block bitmap display field 143 and a sub-block sub-bitmap 144, wherein the sub-block bitmap index 141 is used for indicating which part of the partial bitmap the sub-bitmap is, the sub-block bitmap control field 142 is used for indicating an encoding mode for the sub-block sub-bitmap, the sub-block bitmap display field 143 is used for controlling the sub-block sub-bitmap 144, for example, hiding the bytes which are all zero in the sub-block sub-bitmap, and the sub-block sub-bitmap 144 is used for enabling a user terminal to know whether there are data cached in an access point, or enabling the user terminal to know whether to access to a channel.

Figure 3:
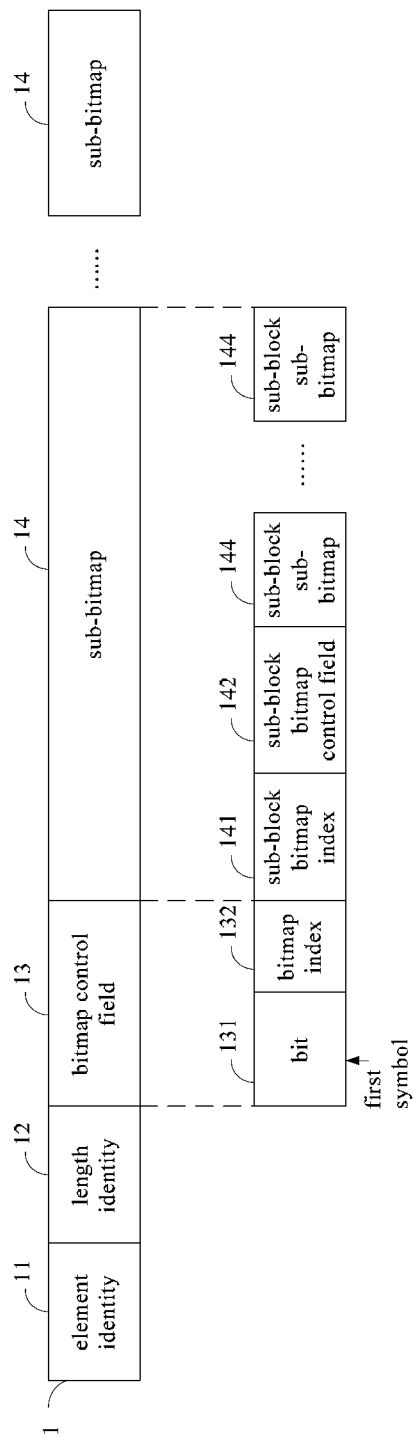
FIG. 3 is a third one of a structure schematic diagram of a traffic indication map provided by an embodiment of the present disclosure.

When the access point determines that the difference between the quantity of user terminals with cached data and the quantity of user terminals without cached data is not larger than a preset first threshold, as shown in FIG. 3, the access point marks the bit 131 in the bitmap control field 13 with a first symbol, and hides the sub-block bitmap display field 143 in each sub-bitmap 14, or, marks the bit 131 in the bitmap control field 142 with a second symbol, and displays the sub-block bitmap display field 143 in each sub-bitmap. If the bit 131 in the bitmap control field 13 is marked with the first symbol, it is indicated that each sub-bitmap 14 includes at least one sub-block sub-bitmap 144, the quantity of the sub-block sub-bitmap 144 may be eight specifically, and the length of each sub-block sub-bitmap 144 is at least one byte.

Herein, the access point may mark at least one bit from the first bit 131 to the fifth bit 131 of the bitmap control field 13, for example, by marking 1, may use one bit to indicate hiding of the sub-block bitmap display field 143 in each sub-bitmap 14, or, by marking 101, may use three bits to indicate hiding of the sub-block bitmap display field 143 in each sub-bitmap 14. Because they are all used for controlling display or hiding of the sub-block bitmap display field 143 in each sub-bitmap 14, they should all fall within the protection scope of the embodiment.

Figure 4:
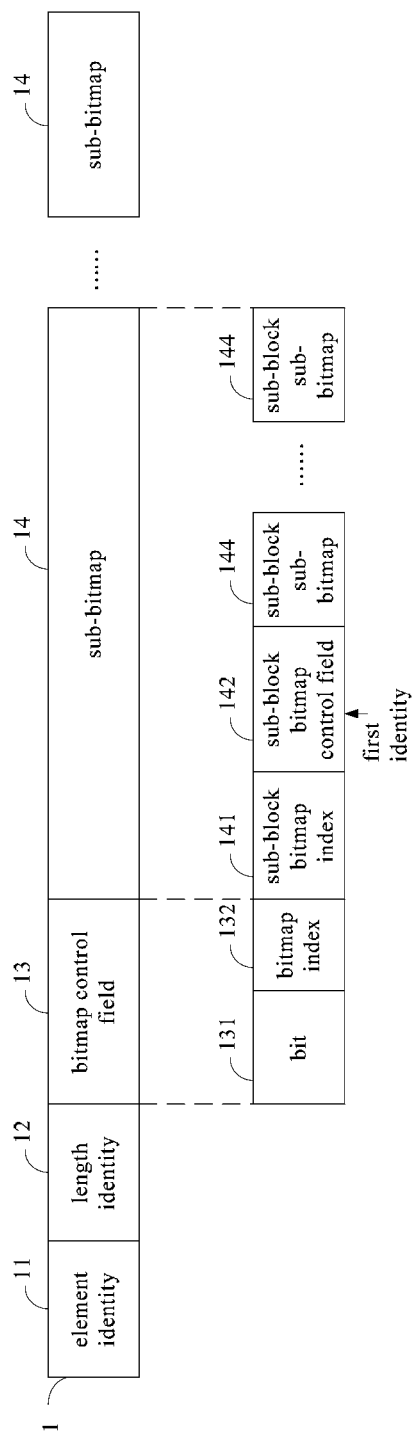
FIG. 4 is a fourth one of a structure schematic diagram of a traffic indication map provided by an embodiment of the present disclosure.

Or, as shown in FIG. 4, a first identity is set in the sub-block bitmap control field 142 of the sub-bitmap 14, and the sub-block bitmap display field 143 in the sub-bitmap 14 is hidden, or when the absolute value of the difference between the quantity of user terminals with cached data and the quantity of user terminals without cached data is larger than the preset first threshold, the sub-block bitmap display field 143 in the sub-bitmap 14 is displayed. If the first identity is set in the sub-block bitmap control field 142 in the sub-bitmap 14, it is indicated that the sub-bitmap 14 includes at least one sub-block sub-bitmap 144, and the sub-block sub-bitmaps 144 may specifically be a partial bitmap.

Figure 5:
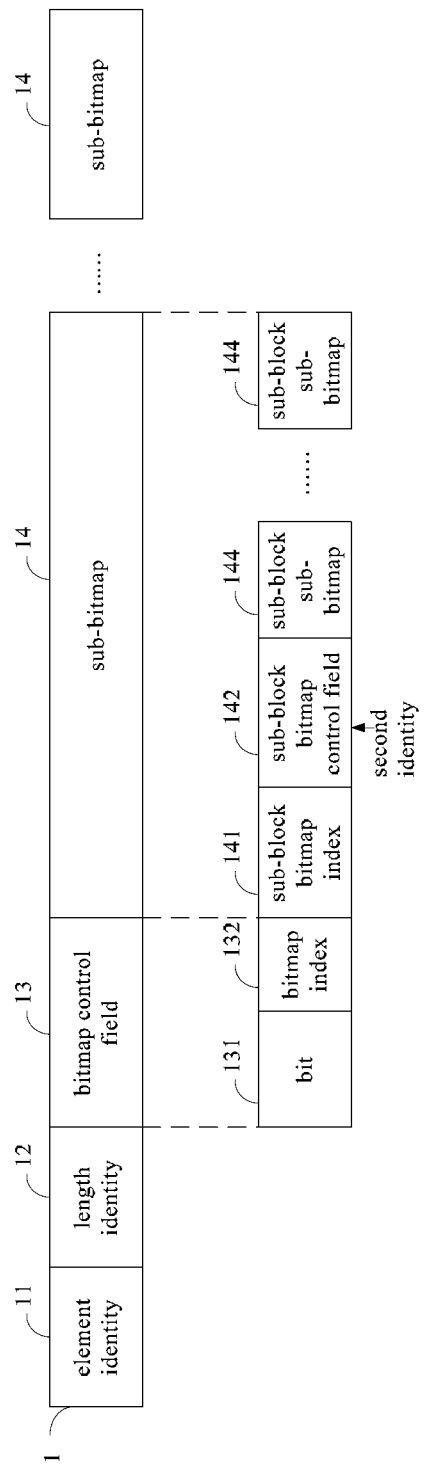
FIG. 5 is a fifth one of a structure schematic diagram of a traffic indication map provided by an embodiment of the present disclosure.

When the differences among association identifiers of user terminals with cached data are all not smaller than a preset second threshold, as shown in FIG. 5, a second identity is set in the sub-block bitmap control field 142 in the sub-bitmap 14, and the sub-block bitmap display field 143 in the sub-bitmap 14 is hidden, wherein the low-order six bits of the sub-block sub-bitmap 144 in the sub-bitmap 14 represent the low-order six bits of an association identifier of a user terminal, or, when the differences among association identifiers of user terminals with cached data are all smaller than the second threshold, the sub-block bitmap display field 143 in the sub-bitmap 14 is displayed. If the second identity is set in the sub-block bitmap control field 142 in the sub-bitmap 14, it is indicated that the sub-bitmap 14 includes zero to eight sub-block sub-bitmaps 144, and the length of each sub-block sub-bitmap 144 is one byte.

A user terminal may know whether there are data cached in an access point by reading data of the sub-block sub-bitmap 144 in the sub-bitmap 14 according to an association identifier.

Similarly, the user terminal may know whether to access to a channel by reading the data of the sub-block sub-bitmap 144 in the sub-bitmap 14 according to the association identifier. Because the structure of the traffic indication map is the same as that provided by the above-mentioned embodiment, it is not described redundantly herein, but it should fall within the protection scope of the present disclosure.

Figure 6:
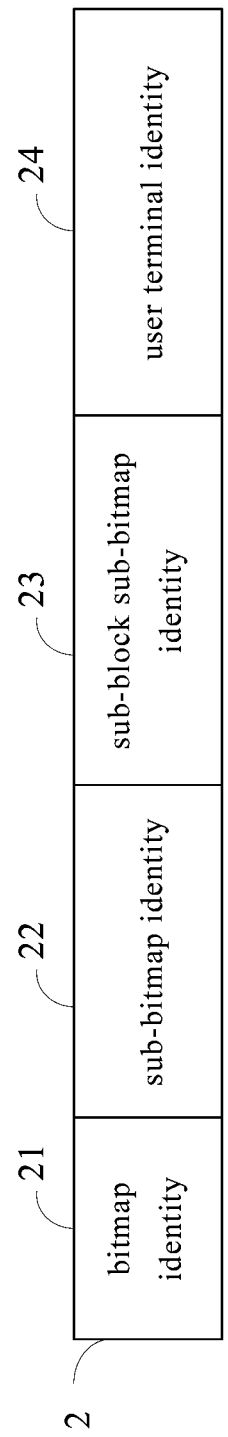
FIG. 6 is a structure schematic diagram of an association identifier provided by an embodiment of the present disclosure.

Herein, as shown in FIG. 6, the structure of an association identifier 2 is illustrated, so as to know how a user terminal reads data in a sub-block sub-bitmap according to the association identifier 2. A corresponding relationship exists between the association identifier 2 and a traffic indication map, and an association identifier 2 may be twelve bits. The association identifier 2 includes a bitmap identity 21, a sub-bitmap identity 22, a sub-block sub-bitmap identity 23 and a user terminal identity 24. The bitmap identity 21 is used for finding which partial bitmap a user terminal corresponds to, the sub-bitmap identity 22 is used for finding which sub-bitmap the user terminal corresponds to, the sub-block sub-bitmap identity 23 is used for finding which sub-block sub-bitmap the user terminal corresponds to in the sub-bitmap, the user terminal identity 24 is used for finding which bit the user terminal corresponds to in the sub-block sub-bitmap, and the user terminal knows whether there are data cached in an access point or whether to access to a channel by reading data in the bit.

According to the traffic indication map provided by the embodiments of the present disclosure, whether to display the sub-block bitmap display field in the sub-bitmap is controlled by marking at least one bit in the bitmap control field, or setting the first identity in the sub-block bitmap control field in the sub-bitmap or setting the second identity in the sub-block bitmap control field in the sub-bitmap, finally, the user terminal knows whether there are data cached in the access point or whether to access to a channel by the sub-block sub-bitmap in the sub-bitmap. By the solution, the user terminal is enabled to know whether there are data cached in the access point, or the user terminal is enabled to know whether to access to a channel, and the quantity of bytes occupied by the traffic indication map in the beacon frame may be reduced by controlling whether to display the sub-block bitmap display field in the sub-bitmap.

It should be appreciated for those of ordinary skill in the art that all or a part of the procedures in the above-mentioned embodiments of a method may be implemented with a computer program instructing corresponding hardware. The above-mentioned program may be stored in a computer readable storage medium. The procedures of the embodiments of the respective methods mentioned above may be included when the program is executed; and the above-mentioned storage medium includes various kinds of medium that may store program codes, such as a ROM, a RAM, a magnetic disk, an optical disk, or the like.

What is claimed is:

1. A method of encoding a traffic indication map, the method comprising:
controlling whether to display or hide a sub-block bitmap display field in a sub-bitmap by marking, in an access point, at least one bit in a traffic indication map, wherein a sub-block sub-bitmap in the sub-bitmap enables a user terminal to know whether there are data cached in the access point, or enables the user terminal to know whether to access to a channel, and the sub-block bitmap display field controls the sub-block sub-bitmap to hide a byte which is zero, wherein the controlling whether to display or hide the sub-block bitmap display field in the sub-bitmap by marking at least one bit in the traffic indication map comprises:
controlling whether to display or hide the sub-block bitmap display field in the sub-bitmap by marking, in the access point, at least one bit in a bitmap control field in the traffic indication map, wherein the controlling whether to display or hide the sub-block bitmap display field in the sub-bitmap by marking at least one bit in a bitmap control field, wherein the sub-block sub-bitmap in the sub-bitmap enables the user terminal to know whether there are data cached in the access point, comprises one of the following:

when a difference between a quantity of user terminals with cached data and a quantity of user terminals without cached data is not larger than a preset first threshold, marking at least one bit in the bitmap control field with a first symbol, and hiding the sub-block bitmap display field in each sub-bitmap, and when an absolute value of a difference between a quantity of user terminals with cached data and a quantity of user terminals without cached data is larger than a preset first threshold, marking at least one bit in the bitmap control field with a second symbol, and displaying the sub-block bitmap display field in each sub-bitmap.

2. The encoding method of claim 1, wherein if the bit in the bitmap control field is marked with the first symbol, it is indicated that each sub-bitmap comprises at least one sub-block sub-bitmap and a length of each sub-block sub-bitmap is at least one byte.

3. The encoding method of claim 1, wherein whether to display or hide the sub-block bitmap display field in the sub-bitmap is controlled by marking at least one bit from a first bit to a fifth bit in the bitmap control field.

4. A method for encoding a traffic indication map, the method comprising:

controlling whether to display or hide a sub-block bitmap display field in a sub-bitmap by setting, in an access point, a first identity in a sub-block bitmap control field in the sub-bitmap, wherein a sub-block sub-bitmap in the sub-bitmap enables a user terminal to know whether there are data cached in an access point, or enables the user terminal to know whether to access to a channel, and the sub-block bitmap display field controls the sub-block sub-bitmap to hide a byte which is zero, wherein the controlling whether to display or hide the sub-block bitmap display field in the sub-bitmap by setting the first identity in the sub-block bitmap control field in the sub-bitmap, wherein the sub-block sub-bitmap in the sub-bitmap enables the user terminal to know whether there are data cached in the access point, comprises one of the following:

when a difference between a quantity of user terminals with cached data and a quantity of user terminals without cached data is not larger than a preset first threshold, setting the first identity in the sub-block bitmap control field in the sub-bitmap, and hiding the sub-block bitmap display field in the sub-bitmap, and when an absolute value of a difference between a quantity of user terminals with cached data and a quantity of user terminals without cached data is larger than a preset first threshold, displaying the sub-block bitmap display field in the sub-bitmap.

5. The encoding method of claim 4, wherein if the first identity is set in the sub-block bitmap control field in the sub-bitmap, it is indicated that the sub-bitmap comprises at least one sub-block sub-bitmap.

6. A method for encoding a traffic indication map, the method comprising:

controlling whether to display or hide a sub-block bitmap display field in a sub-bitmap by setting, in an access point, a second identity in a sub-block bitmap control field in the sub-bitmap, wherein a sub-block sub-bitmap in the sub-bitmap enables a user terminal to know whether there are data cached in an access point, or enables the user terminal to know whether to access to a channel, and the sub-block bitmap display field controls the sub-block sub-bitmap to hide a byte which is zero, wherein the controlling whether to display or hide the sub-block bitmap display field in the sub-bitmap by setting the second identity in the sub-block bitmap control field in the sub-bitmap, wherein the sub-block sub-bitmap in the sub-bitmap enables the user terminal to know whether there are data cached in the access point, comprises one of the following:

when differences among association identifiers of user terminals with cached data are all not smaller than a preset second threshold, setting the second identity in the sub-block bitmap control field in the sub-bitmap, and hiding the sub-block bitmap display field in the sub-bitmap, wherein low-order six bits of the sub-block sub-bitmap in the sub-bitmap represent low-order six bits of an association identifier of the user terminal, and when differences among association identifiers of user terminals with cached data are all smaller than the second threshold, displaying the sub-block bitmap display field in the sub-bitmap.

7. The encoding method of claim 6, wherein if the second identity is set in the sub-block bitmap control field in the sub-bitmap, it is indicated that the sub-bitmap comprises zero to eight sub-block sub-bitmaps, and a length of each sub-block sub-bitmap is one byte.

8. A method for transmitting a beacon frame, comprising:

transmitting a beacon frame, wherein the beacon frame comprises:

a traffic indication map, wherein the traffic indication map comprises an element identity and a length identity, wherein the element identity indicates that a code is the traffic indication map, and the length identity indicates a length of the traffic indication map, and a bitmap control field and a sub-bitmap, used for controlling whether to display or hide a sub-block bitmap display field in the sub-bitmap by marking at least one bit in the bitmap control field, wherein a sub-block sub-bitmap in the sub-bitmap enables a user terminal to know whether there are data cached in an access point, or enables the user terminal to know whether to access to a channel, and the sub-block bitmap display field controls the sub-block sub-bitmap to hide a byte which is zero, wherein the controlling whether to display or hide the sub-block bitmap display field in the sub-bitmap by marking at least one bit in the bitmap control field, wherein the sub-block sub-bitmap in the sub-bitmap enables the user terminal to know whether there are data cached in the access point, comprises one of the following:

when a difference between a quantity of user terminals with cached data and a quantity of user terminals without cached data is not larger than a preset first threshold, marking at least one bit in the bitmap control field with a first symbol, and hiding the sub-block bitmap display field in each sub-bitmap, and when an absolute value of a difference between a quantity of user terminals with cached data and a quantity of user terminals without cached data is larger than a preset first threshold, marking at least one bit in the bitmap control field with a second symbol, and displaying the sub-block bitmap display field in each sub-bitmap.

9. The method of claim 8, wherein if the bit in the bitmap control field is marked with the first symbol, it is indicated that each sub-bitmap comprises at least one sub-block sub-bitmap, and a length of each sub-block sub-bitmap is at least one byte.

10. The method of claim 8, wherein whether to display or hide the sub-block bitmap display field in the sub-bitmap is controlled by marking at least one bit from a first bit to a fifth bit in the bitmap control field.

11. A method for transmitting a beacon frame, comprising:
    transmitting a beacon frame, wherein the beacon frame comprises:
    a traffic indication map, wherein the traffic indication map comprises an element identity and a length identity, wherein the element identity indicates that a code is the traffic indication map, and the length identity indicates a length of the traffic indication map, and
    a sub-bitmap, used for controlling whether to display or hide a sub-block bitmap display field in the sub-bitmap by setting a first identity in a sub-block bitmap control field in the sub-bitmap, wherein a sub-block sub-bitmap in the sub-bitmap enables a user terminal to know whether there are data cached in an access point, or enables the user terminal to know whether to access to a channel, and the sub-block bitmap display field controls the sub-block sub-bitmap to hide a byte which is zero, wherein the controlling whether to display or hide the sub-block bitmap display field in the sub-bitmap by setting the first identity in the sub-block bitmap control field in the sub-bitmap, wherein the sub-block sub-bitmap in the sub-bitmap enables the user terminal to know whether there are data cached in the access point, comprises one of the following:
        when a difference between a quantity of user terminals with cached data and a quantity of user terminals without cached data is not larger than a preset first threshold, setting the first identity in the sub-block bitmap control field in the sub-bitmap, and hiding the sub-block bitmap display field in the sub-bitmap, and
        when an absolute value of a difference between a quantity of user terminals with cached data and a quantity of user terminals without cached data is larger than a preset first threshold, displaying the sub-block bitmap display field in the sub-bitmap.

12. The method of claim 11, wherein if the first identity is set in the sub-block bitmap control field in the sub-bitmap, it is indicated that the sub-bitmap comprises at least one sub-block sub-bitmap.

13. A method for transmitting a beacon frame, comprising:
    transmitting a beacon frame, wherein the beacon frame comprises:
    a traffic indication map, wherein the traffic indication map comprises an element identity and a length identity, wherein the element identity indicates that a code is the traffic indication map, the length identity indicates a length of the traffic indication map, and
    a sub-bitmap, used for controlling whether to display or hide a sub-block bitmap display field in a sub-bitmap by setting a second identity in a sub-block bitmap control field in the sub-bitmap, wherein a sub-block sub-bitmap in the sub-bitmap enables a user terminal to know whether there are data cached in an access point, or enables the user terminal to know whether to access to a channel, and the sub-block bitmap display field controls the sub-block sub-bitmap to hide a byte which is zero, wherein the controlling whether to display or hide the sub-block bitmap display field in the sub-bitmap by setting the second identity in the sub-block bitmap control field in the sub-bitmap, wherein the sub-block sub-bitmap in the sub-bitmap enables the user terminal to know whether there are data cached in the access point, comprises one of the following:
        when differences among association identifiers of user terminals with cached data are all not smaller than a preset second threshold, setting the second identity in the sub-block bitmap control field in the sub-bitmap, and hiding the sub-block bitmap display field in the sub-bitmap, wherein low-order six bits of the sub-block sub-bitmap in the sub-bitmap represent low-order six bits of an association identifier of the user terminal, and
        when differences among association identifiers of user terminals with cached data are all smaller than the second threshold, displaying the sub-block bitmap display field in the sub-bitmap.

* * * * *